United States Patent
Liu et al.

(10) Patent No.: US 8,339,942 B2
(45) Date of Patent: Dec. 25, 2012

(54) RSVP-TE GRACEFUL RESTART UNDER FAST RE-ROUTE CONDITIONS

(75) Inventors: Hua Autumn Liu, Santa Clara, CA (US); Venkatesan Pradeep, Cupertino, CA (US); Sriganesh Kini, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 459 days.

(21) Appl. No.: 12/580,019

(22) Filed: Oct. 15, 2009

(65) Prior Publication Data
US 2011/0090786 A1    Apr. 21, 2011

(51) Int. Cl.
*G01R 31/08* (2006.01)
*G01F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........ 370/218; 370/219; 370/220; 370/225; 370/228

(58) Field of Classification Search .......... 370/218–220, 370/225, 228
See application file for complete search history.

(56) References Cited

U.S. PATENT DOCUMENTS

| | | | |
|---|---|---|---|
| 2003/0210705 A1* | 11/2003 | Seddigh et al. | 370/419 |
| 2006/0013126 A1* | 1/2006 | Yasuoka et al. | 370/217 |
| 2008/0025222 A1* | 1/2008 | Nikolova et al. | 370/238 |
| 2008/0192762 A1* | 8/2008 | Kompella et al. | 370/410 |

OTHER PUBLICATIONS

"RSVP-TE Graceful Restart under Fast Re-route conditions, draft-liu-mpls-rsvp-te-gr-frr-00.txt"; Liu, A., Kini, S.; Internet Engineering Task Force IETF Standardworkingdraft, Internet Society (ISOC) 4, Rue Des Falaises Ch 1205 Geneva Switzerland; Oct. 13, 2009 XP015064594.*

Awduche, D. et al. "RSVP-TE: Extensions to RSVP for LSP Tunnels," Network Working Group, Request for Comments: 3209, Category: Standards Track, Dec. 2001, 62 pages.

Berger, L. Ed. "Generalized Multi-Protocol Label Switching (GMPLS) Signaling Resource Reservation Protocol-Traffic Engineering (RSVP-TE) Extensions," Network Working Group, Request for Comments: 3473, Category: Standards Track, Jan. 2003, 43 pages.

(Continued)

*Primary Examiner* — Hoon J Chung
*Assistant Examiner* — Benjamin H Elliott, IV
(74) *Attorney, Agent, or Firm* — Blakely Sokoloff Taylor & Zafman, LLP

(57) ABSTRACT

According to one embodiment, in response to at least one of a link failure and node failure of a protected label switched path (LSP), network traffic is switched onto a protection path according to a fast re-reroute (FRR) scheme. A HELLO session is established with the remote node that is not immediately adjacent to the network element, including exchanging one or more HELLO messages with the remote node, each HELLO message having a time-to-live (TTL) value of greater than one if IP forwarding is used. The TTL value of the HELLO message is set to one if the HELLO message is sent via tunnel. In response to a request to restart, a resource reservation protocol (RSVP) traffic engineering (TE) graceful restart (GR) procedure is performed using information obtained from the one or more HELLO messages exchanged with the remote node during the HELLO session.

20 Claims, 5 Drawing Sheets

OTHER PUBLICATIONS

Pan, P. et al. Ed. "Fast Reroute Extensions to RSVP-TE for LSP Tunnels," Network Working Group, Request for Comments: 4090, Category: Standards Track, May 2005, 39 pages.

Ali, Z. et al. "Node-ID Based Resource Reservation Protocol (RSVP) Hello: A Clarification Statement," Network Working Group, Request for Comments: 4558, Category: Standards Track, Jun. 2006, 8 pages.

Satyanarayana, A. et al. Ed. "Extensions to GMPLS Resource Reservation Protocol (RSVP) Graceful Restart," Network Working Group, Request for Comments: 3209, Updates: 2961, 3473, Category: Standards Track, Oct. 2007, 26 pages.

A. Satyanarayana, et al., "Extensions to GMPLS Resource Reservation Protocol (RSVP) Graceful Restart", RFC 5063, Sep. 2007, 24 pp., The IETF Trust, downloaded from http://tools.ietf.org/html/rfc5063.

F. Baker et al., "RSVP Cryptographic Authentication", RFC 2747, Jan. 2000, 21 pages, The Internet Society, downloaded from http://tools.ietf.org/html/rfc2747.

* cited by examiner

RSVP-TE GRACEFUL RESTART UNDER FAST RE-ROUTE CONDITIONS

FIELD OF THE INVENTION

Embodiments of the invention relate generally to the field of networking; and more particularly, to RSVP-TE graceful restart of a network element.

BACKGROUND

Resource reservation protocol (RSVP) traffic engineering (RSVP-TE) graceful restart (GR) scheme provides a mechanism to preserve a label switched path (LSP) during a control plane failure of a network element or network node so that traffic is not impacted. Further detailed information regarding the RSVP GR specification can be found in several request for comments (RFCs) such as RFC-3473 and RFC-5063.

RSVP fast reroute (FRR) scheme is specified in RFC-4090 and provides a fast local repair mechanism when link or node failure occurs so that the traffic can be switched on a point of local repair (PLR) node to a pre-established bypass tunnel from the protected LSP for facility protection. A merge point (MP) node merges the traffic back to the protected LSP. The bypass tunnel can provide the FRR protection for multiple protected LSPs (1:N protection). When the FRR is in effect, the traffic could stay in the bypass path for an extended period of time. During this period of time, if the PLR node or MP node restarts, the RSVP GR procedures cannot be applied because no HELLO message is exchanged between the PLR node and the MP node if the MP node is not directly connected with the PLR node. As defined in RFC-3209, an RSVP HELLO session is running between immediate neighboring nodes only.

According to RFC-3209, RSVP HELLO messages are exchanged between directly connected neighboring nodes to detect the health of a control plane of the neighboring nodes. RFC-3473 extends the RSVP HELLO mechanism to support RSVP Graceful Restart functionality. A HELLO message is used to carry a graceful restart capability object and information that is used to preserve the LSP and recover the LSP state after a control plane of a network element fails or restarts. If the HELLO session is not established, the graceful restart cannot be achieved. RFC-4558 introduces node-id based HELLO messages.

SUMMARY OF THE DESCRIPTION

A method is provided to establish a HELLO session with a remote node that is not immediately adjacent to the network element for the purpose of performing a graceful restart of the network element. According to one aspect of the invention. A HELLO session is established with the remote node that is not immediately adjacent to the network element, by exchanging HELLO messages with the remote node. The HELLO message can be sent using IP forwarding while the time-to-live (TTL) value of the HELLO message should be set to greater than one. Only the targeted network element processes the HELLO message and responds the HELLO message with ACK/NACK to the sender of the HELLO message. All other nodes in the network just forward the HELLO message toward the destination of the HELLO message if the TTL value of the message is greater than zero. If the TTL value of a HELLO message reaches zero, the HELLO message will be discarded silently. If there is a tunnel between the non-directly-connected nodes, the HELLO message can be sent via the tunnel while the TTL value of the HELLO message may be set to one.

According to another aspect of the invention, a HELLO session can be established with the remote network element which is not immediately adjacent to the network element before the link/node failure of the protected LSPs. In response to the link/node failure of the protected LSPs, the traffic is switched onto the bypass tunnel according to a fast-re-route (FRR) scheme. Subsequently, in response to a request to control plane failure or restart, a resource reservation protocol (RSVP) traffic engineering (TE) graceful restart (GR) procedure is performed using information obtained from HELLO messages exchanged with the remote node during the HELLO session. The information obtained from the HELLO messages helps to preserve the state of protected LSPs.

According to another aspect of the invention, a HELLO session can be established with a network element which is not immediately adjacent to the network element, in response to the FRR triggered by a link/node failure of the protected LSPs and a bypass tunnel is established to carry the traffic of the protected LSPs. The non-directly-connected nodes exchange HELLO messages which include the Restart_Cap object which can be used to preserve and recover the states of protected LSPs if Graceful Restart takes place when control plane fails or restarts. The HELLO message exchanged between the non-directly-connected nodes can be sent using IP forwarding while the TTL value of the HELLO message is set to greater than one. If the HELLO message can be sent via the tunnel between the non-directly-connected nodes, the TTL value of the HELLO message may be set to one.

According to another aspect of the invention, a HELLO session between the non-directly-connected network elements can be initiated by configuring the remote network element as its logical neighbor on either side. The configured address of the remote network element is used on the destination address field of the HELLO message which is sent toward the remote network element. The response from the remote network element completes the HELLO session establishment.

According to another aspect of the invention, a HELLO session between the non-directly-connected network elements can be initiated by a PATH message received at the network element from the remote network element, via IP forwarding or bypass tunnel that is configured to protect the protected label switched paths (LSPs), before or after the link/node failure occurs and FRR is triggered. In response to the path message, a HELLO session is established with the remote node that is not immediately adjacent to the network element, including exchanging HELLO messages with the remote node, each HELLO message having a time-to-live (TTL) value of 255. In response to a link failure and/or node failure of the protected LSPs, the network traffic has been switched onto the bypass tunnel using a fast re-route (FRR) scheme. Subsequently, in response to a request to restart, a resource reservation protocol (RSVP) traffic engineering (TE) graceful restart (GR) procedure is performed using information obtained from the one or more HELLO messages exchanged with the remote node during the HELLO session. The information obtained from the o HELLO messages helps to preserve the state of protected LSPs.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
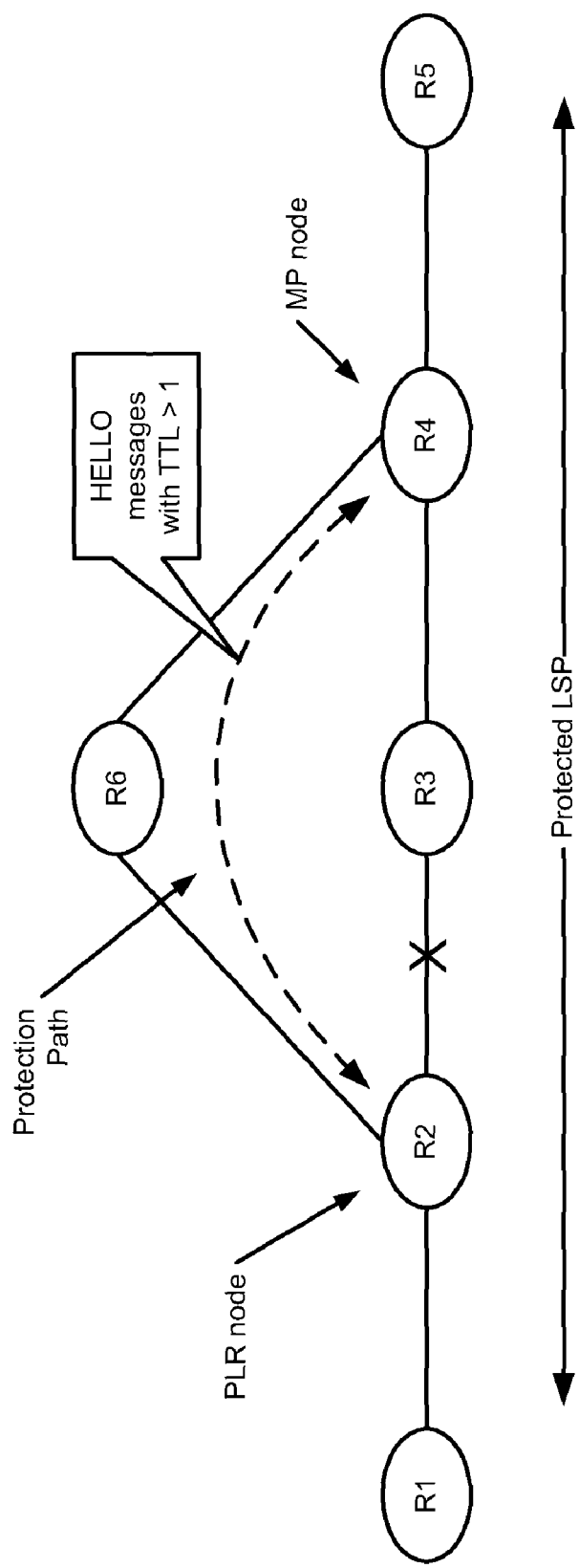
FIG. 1 is a block diagram illustrating a network configuration which may be used with an embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

According to one embodiment, an extension to an RSVP HELLO mechanism is provided to allow a HELLO session to operate between non-directly connected neighboring nodes, such as, for example, a PLR node and an MP node where there is at least one intermediate node in between in the protection path. As a result, the RSVP graceful restart of the PLR node and MP node can be performed even the FRR is in effect.

As described above, in general, RSVP HELLO messages are exchanged between directly connected neighboring nodes to detect the health of the control planes of the neighboring nodes. Such HELLO mechanism has been extended to support RSVP GR functionality. The HELLO messages are used to carry graceful restart capability objects and information used to preserve the LSP and recover the LSP state after control plane fails or restarts. If a HELLO session is not established, the graceful restart cannot be achieved.

As described above, when a link/node fails, the FRR is triggered and the PLR node moves the network traffic to the bypass tunnel for facility protection. The traffic is merged back to the LSP at the MP node. The traffic could flow through bypass tunnel for an extended period of time and if during this period of time, the control plane restarts at PLR or MP node, traffic on the protected LSPs may be lost because the traffic flows through the bypass tunnel between the PLR and MP node and the protected LSPs are not preserved due to lack of graceful restart capability. According to RFC-3209, a HELLO session cannot be established between the PLR and MP node if there is more than one hop in between. In this situation, they are not direct neighbors physically although they form logical neighbors from the protected LSP point of view because the PATH message is sent via the bypass tunnel.

For example, as shown in FIG. 1, the protected LSP is setup as R1-R2-R3-R4-R5. A bypass tunnel for node protection is established as R2-R6-R4. When a link between R2-R3 or node R3 fails, the R2 (e.g., PLR node) switches the traffic flowing through the bypass R2-R6-R4 based on the FFR scheme. While the FRR is in effect, if R2 or R4 restarts, since a HELLO session cannot be established between R2 and R4 because they are not immediately adjacent to each other, the graceful restarts of R2 and R4 are not performed and the LSP is not preserved, as a result, the network traffic is impacted.

According to one embodiment, a HELLO session can be established through the exchange of HELLO messages between the nodes which are not immediate neighboring nodes. The time-to-live (TTL) field of an IP header for all outgoing HELLO messages to a neighbor is set to the value larger than 1. In a preferred embodiment, a TTL value of 255 is used if the Hello message is sent via IP forwarding. The node identifier (ID) or an interface address (e.g., IPv4 or IPv6) of the remote node is used in the destination fields of a HELLO packet. The corresponding HELLO message handling procedures such as those described in RFC-3209 and RFC-3473 apply. Once the hello session is established between these non-directly-connected node, the RSVP graceful restart procedures such as those described in the RFC-3473 and RFC-5063 can be applied to these nodes.

A non-directly connected neighbor can be discovered dynamically on the local node if a HELLO session is required. For example, when a tunnel is setup, the ingress and egress nodes can form neighbors for a HELLO session. When a non-directly connected neighbor is discovered by the local node for which a HELLO session is required, a HELLO message containing a HELLO REQUEST object is sent out toward the remote node where the destination address field of the HELLO message is specified with the address of the remote node.

In RSVP FRR facility protection case, when the bypass tunnel is established or selected by PLR for the protected LSP, the PLR may initiate the HELLO session by sending a HELLO message containing Hello Request object toward the bypass egress node. The HELLO message can be sent using IP forwarding or via the bypass tunnel. When the egress node of the bypass tunnel receives the HELLO request message, it sends back a HELLO message with a HELLO_ACK object to the ingress node of the bypass tunnel. When the ingress node of the bypass tunnel receives the HELLO ACK message, the HELLO session is established between the ingress node and the egress node of bypass tunnel.

If there is a tunnel (e.g., an LSP tunnel, or bypass tunnel) between the local node and the remote node, the HELLO message may be sent over the tunnel. If the bypass tunnel is statically configured, running a HELLO session over the tunnel can operate as a data plane liveness check. If such a tunnel is unavailable, a HELLO message is forwarded by IP routing until it reaches the destination or the TTL reaches 0. Only a remote node with the address specified in the destination address field of the HELLO message will process the HELLO message and respond with a HELLO message containing HELLO ACK object toward a sender of the HELLO request message. When the sender of the HELLO request message receives the HELLO message with HELLO ACK, the HELLO session is established.

A remote node can be discovered by receiving an RSVP PATH message when remote node is the egress node of the tunnel and therefore acts as the MP point from FRR perspective. The remote node discovery can be performed before or after link/node fails and FRR takes place.

The remote node can be discovered before the link/node fails by receiving the PATH message of the bypass tunnel at the egress node of the bypass tunnel when bypass tunnel is being established. The egress node, which is also a MP node, receives the PATH message for the bypass tunnel and can initiate a HELLO session by sending a HELLO message with a HELLO Request object toward the ingress node of the bypass, wherein the ingress node is also a PLR node. The HELLO message is sent via IP forwarding with TTL value set to the value greater than one. Upon receipt of the HELLO message with the HELLO Request object on the ingress node of the bypass tunnel, the ingress node of the bypass tunnel responds the HELLO message with HELLO Ack object toward the egress node of the bypass tunnel. When the egress node of the bypass tunnel receives the HELLO message with HELLO Ack object, the HELLO session between the ingress node (PLR node for the protected LSP) and the egress node (MP node for the protected LSP) of the bypass tunnel is established.

The remote node can be discovered after the link/node fails by receiving the PATH message of the protected LSP over the bypass tunnel when FRR is in effect. The MP node receives the PATH message and can initiate a HELLO session by sending a HELLO message with HELLO Request object toward the bypass ingress node. The HELLO message is sent via IP forwarding. Upon receipt of the HELLO message with the HELLO Request object on the ingress node of the bypass tunnel, the ingress node sends HELLO messages with HELLO Ack object toward the egress node of the bypass tunnel. When the egress node of the bypass tunnel receives the HELLO message with the HELLO Ack object, the HELLO session between the ingress node and egress node of the bypass tunnel is established.

A non-directly connected neighbor can be configured on either side of non-directly-connected nodes when a HELLO session is needed between them. The configuration triggers a HELLO message with a HELLO REQUEST object to be sent toward to the remote node. When a HELLO message with a HELLO ACK object is received back from the remote node, the HELLO session is established.

One HELLO session per pair of local node and the remote node is established. If there are multiple tunnels between the nodes, only one HELLO session is established. If there are multiple tunnels for a HELLO session, the selection of which tunnel for forwarding the HELLO messages is performed based on a local policy.

Multiple HELLO sessions can be established between the same pair of local and remote nodes which are not directly connected if it is needed. A Hello session identifier (32 bits) is added to the HELLO messages exchanged between the non-directly-connected nodes to uniquely identify a particular HELLO session along with the source and destination address fields of the HELLO message. According to one embodiment, the support of a HELLO session between non-directly-connected nodes can be enabled or disabled via configuration.

Referring to FIG. 1, when a link, in this example, a link between nodes R2 and R3, is down, network traffic of the protected LSP R2-R3-R4 is switched to a protected path R2-R6-R4, which is a bypass tunnel for FRR facility protection. The network traffic may be switched to a protection path using an FRR scheme by a point of local repair (PLR) node, in this example, R2 according to FRR procedures set forth in RFC-4090. Further detailed information concerning the FRR specification can be found in RFC-4090, which is incorporated by reference herein.

In addition, while the FRR is in effect, R2 as a PLR node periodically generates and sends a HELLO message containing a HELLO REQUEST object to R4 as an MP node through the protection path R2-R6-R4. In the HELLO message, the TTL field of the corresponding IP header is set to a value larger than one. Preferably, the TTL field of the HELLO message is set to a value of 255. Typically, the TTL field indicates the maximum time the datagram of a particular IP packet is allowed to remain in the Internet system. If the TTL field contains the value zero, then the datagram must be discarded. The TTL field is modified in internet header processing. The time is measured in units of seconds, but since every module that processes a datagram must decrease the TTL by at least one even if it process the datagram in less than a second, the TTL must be thought of only as an upper bound on the time a datagram may exist. The intention is to cause undeliverable datagrams to be discarded, and to bind the maximum datagram lifetime. A conventional HELLO message described in RFC-3209 requires such a TTL field of a HELLO message to be set to one as the HELLO message is designed to be exchanged between two immediately adjacent or directly connected nodes.

Figure 2:
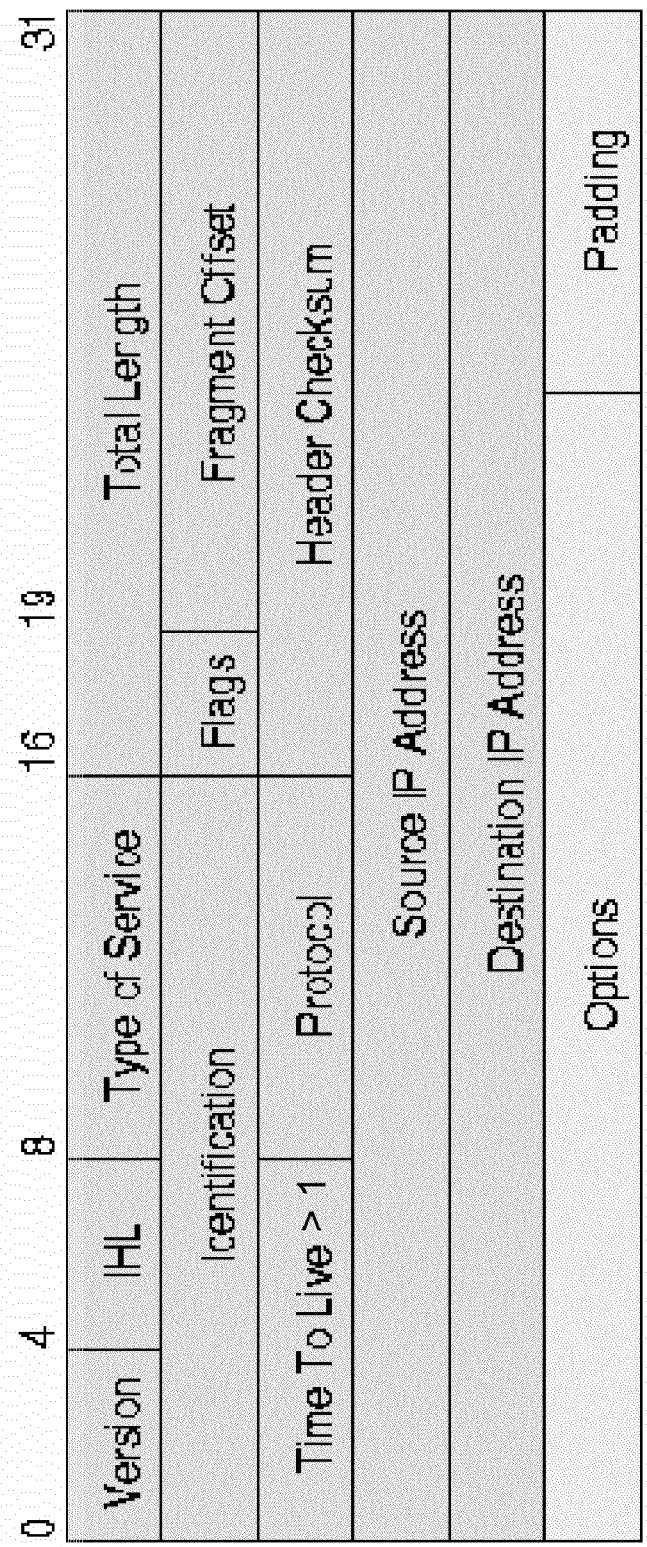
FIG. 2 is a block diagram illustrating an IP header which may be used with a HELLO message according to one embodiment of the invention.

In the example as shown in FIG. 1, since there is at least one hop (e.g., node R6) between the PLR node R2 and MP node R4, the conventional HELLO message with TTL value of 1 cannot reach from R2 to R4. That is, by setting TTL field of a HELLO message to a value of one, the HELLO message may be dropped by an intermediate node such as R6. By setting the TTL field of a HELLO message greater than 1, preferably 255, such a HELLO can message can reach R4 from R2. FIG. 2 is a block diagram illustrating an IP header which may be used with a HELLO message, where the TTL field of the IP header is configured to be larger than one, preferably 255. Further detailed information concerning HELLO protocols in various operating configurations can be found in RFC-3209, RFC-3473, RFC-4558, and RFC-5063, which are incorporated by reference herein. The techniques described throughout this application can be applied to the configurations defined in above-mentioned RFCs.

In response, R4 as an MP node replies a HELLO message with a HELLO ACK object. Since R2 and R4 can exchange the HELLO messages, when either one of R2 and R4 performs a graceful restart, the protected LSPs using the bypass tunnel can be preserved for a quick recovery.

Figure 3:
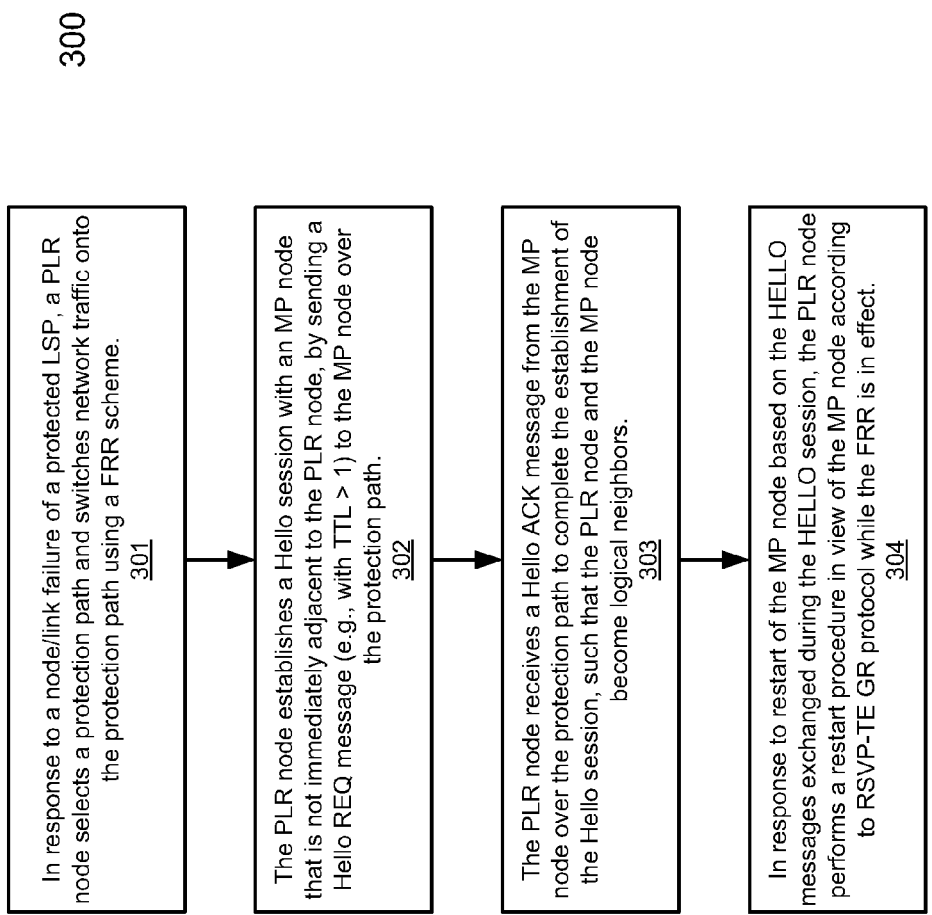
FIG. 3 is a flow diagram illustrating a method for initiating a HELLO session by a PLR node according to one embodiment of the invention.

FIG. 3 is a flow diagram illustrating a method for initiating a HELLO session by a PLR node according to one embodiment of the invention when HELLO session is initiated and established after the FRR takes place which is triggered by link/node failure of the protected LSPs. Note that method 300 may be performed by processing logic which may include software, hardware, or a combination both. For example, method 300 may be performed by a PLR node such as R2 of FIG. 1. Referring to FIG. 3, at block 301, in response to a node/link failure of a protected LSP (e.g., R2-R3-R4 of FIG. 1), a PLR node (e.g., R2 of FIG. 1) switches the network traffic onto a protection path (e.g., R2-R6-R4 of FIG. 1) based on an FRR scheme. At block 302, the PLR node establishes a HELLO session of an RSVP-TE GR with an MP node (e.g., R4 of FIG. 1) that is not immediately adjacent to the PLR node, including sending a HELLO request message with TTL greater than one to the MP node over the protection path. In response, at block 303, the MP node returns a HELLO acknowledgement message back to the PLR node to complete the HELLO session establishment. Note that a HELLO session can be established (block 302 and 303) prior to switching the traffic onto the protection path.

At block 304, in response to a request to restart, the PLR node performs a graceful restart operations while the FRR is in effect, using information obtained from the HELLO messages exchanged in the HELLO session.

Figure 4:
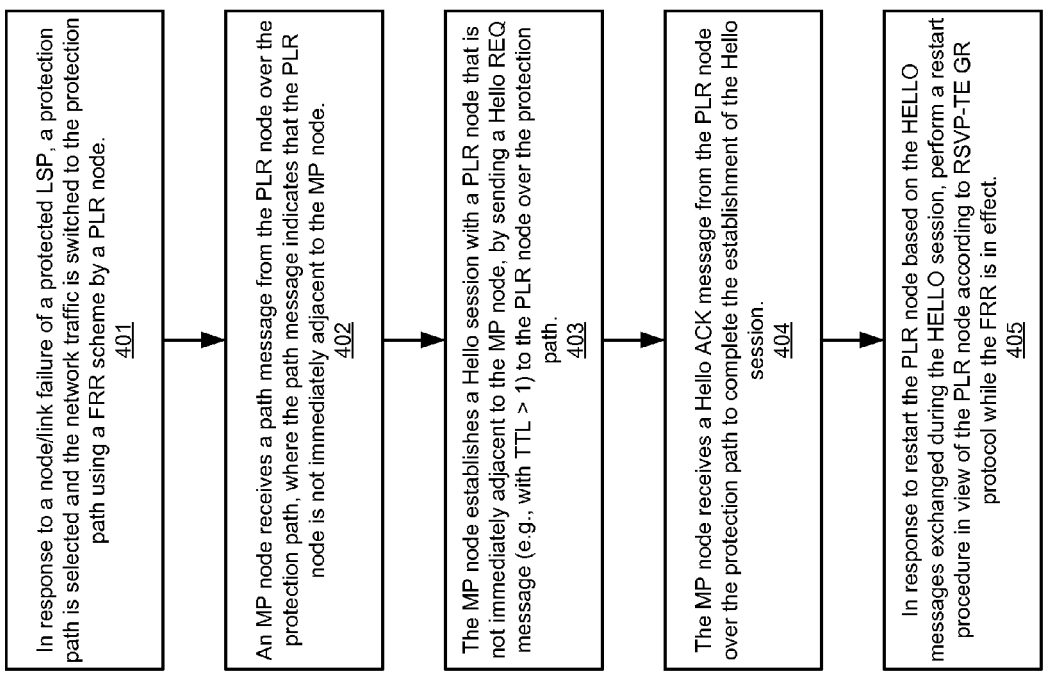
FIG. 4 is a flow diagram illustrating a method for initiating a HELLO session by an MP node according to one embodiment of the invention.

FIG. 4 is a flow diagram illustrating a method for initiating a HELLO session by an MP node according to one embodiment of the invention when HELLO session is initiated and established after the FRR takes place which is triggered by link/node failure of the protected LSPs. Note that method 400 may be performed by processing logic which may include software, hardware, or a combination both. For example, method 400 may be performed by an MP node such as R4 of FIG. 1. Referring to FIG. 4, at block 401, in response to a node/link failure of a protected LSP (e.g., R2-R3-R4 of FIG. 1), a PLR node (e.g., R2 of FIG. 1) switches the network traffic onto a protection path (e.g., R2-R6-R4 of FIG. 1) based on an FRR scheme. At block 402, an MP node (e.g., R4 of FIG. 1) receives a path message from the PLR node over the protection path, where the path message indicates that the PLR node is not immediately adjacent to the MP node. At block 403, the MP node establishes a HELLO session with the PLR node that is not immediately adjacent to the MP node, including sending a HELLO request message with a TTL field having a value greater than one, preferably 255, to the PLR node (e.g., R2 of FIG. 1) over the protection path. At block 404, the MP node receives a HELLO acknowledgment message from the PLR node over the protection path to complete the HELLO session. Note that a HELLO session can be established (block 402, 403 and 404) prior to switching the traffic onto the protection path.

At block 405, in response to a request to restart, the MP node performs a graceful restart operations while the FRR is in effect, using information obtained from the HELLO messages exchanged in the HELLO session.

Figure 5:
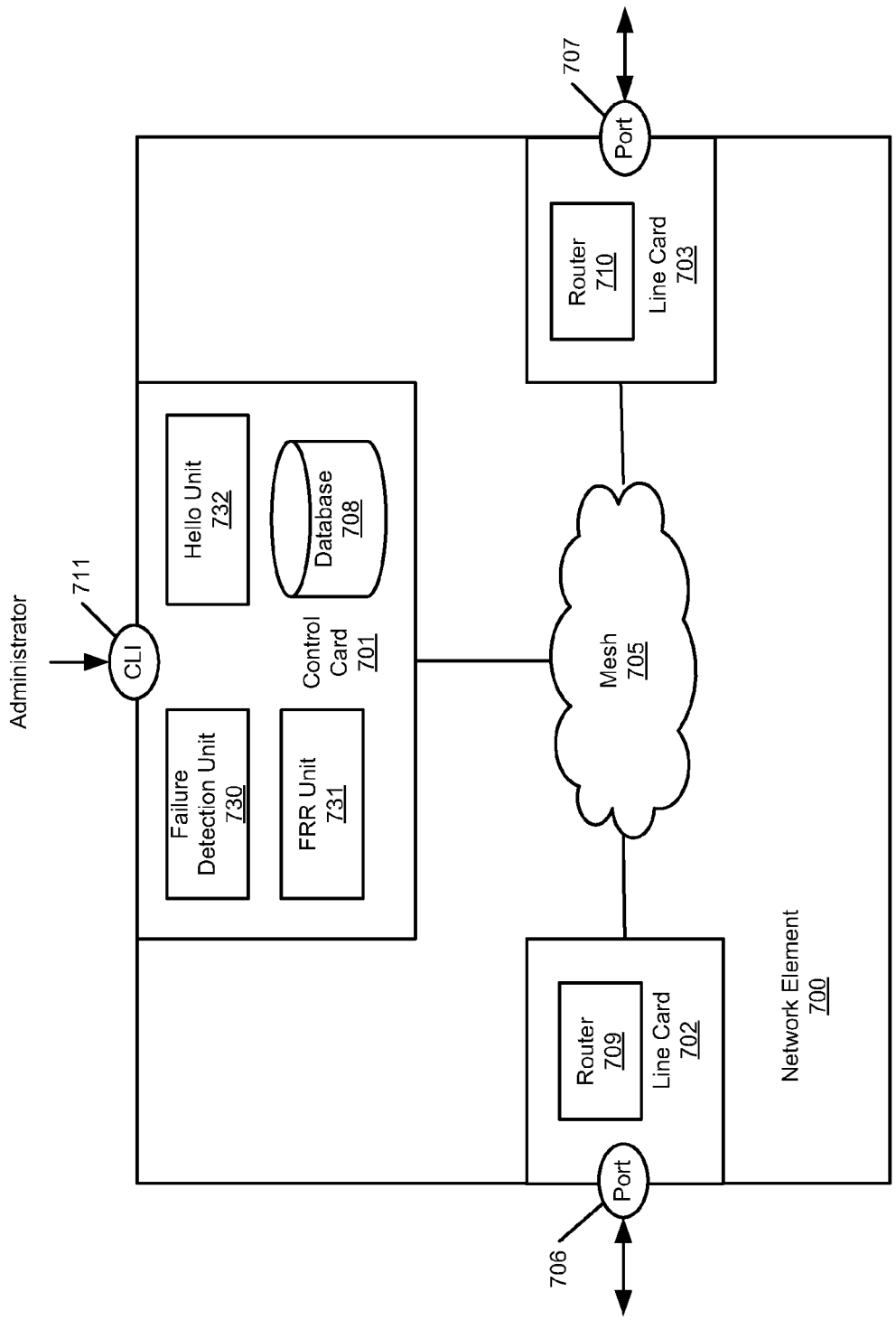
FIG. 5 is a block diagram illustrating a network element according to one embodiment of the invention.

FIG. 5 is a block diagram illustrating a network element according to one embodiment of the invention. Network element 700 may be implemented as any one of network nodes as shown in FIG. 1. For example, network element 700 may be a PLR node or an MP node as described above. Referring to FIG. 5, network element 700 includes, but is not limited to, a control card 701 (also referred to as a control plane) communicatively coupled to one or more line cards 702-703 (also referred to as interface cards or user planes) over a mesh 705, which may be a mesh network, an interconnect, a bus, or a combination thereof. A line card is also referred to as a data plane (sometimes referred to as a forwarding plane or a media plane). Each of the line cards 702-703 is associated with one or more interfaces (also referred to as ports), such as interfaces 706-707 respectively. Each line card includes routing functional block or logic (e.g., blocks 709-710) to route and/or forward packets via the corresponding interface according to a configuration (e.g., routing table) configured by control card 701, which may be configured by an administrator via an interface 711 (e.g., a command line interface or CLI).

According to one embodiment, control card 701 includes, but is not limited to, a failure detection unit 730, an FRR unit 731, a HELLO unit 732, and a database 708. Failure detection unit 730 is adapted to detect whether a particular link or a particular node fails using a variety of communications protocols such as those described in the above mentioned RFCs. In response to a link or node failure, the FRR unit is adapted to switch the network traffic onto a protection path (e.g., a bypass LSP tunnel) based on an FRR scheme as described in the above mentioned RFCs. The HELLO unit 732 is adapted to establish a HELLO session with a remote node (e.g., an MP node or PLR node) that is not immediately adjacent to network element 700, by exchanging HELLO messages having a TTL value greater than one, preferably 255, with the remote node. As a result, unlike a conventional HELLO session, embodiments of the invention allow a HELLO message to reach a non-immediately adjacent node in order to preserve certain states (e.g., connection states) information of a protected LSP to allow a node to gracefully restart while the FRR is in effect.

Referring back to FIG. 5, in the case that the network element 700 is a router (or is implementing routing functionality), the control plane 701 typically determines how data (e.g., packets) is to be routed (e.g., the next hop for the data and the outgoing port for that data), and the data plane (e.g., lines cards 702-703) is in charge of forwarding that data. For example, the control plane 701 typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS), etc.), Label Distribution Protocol (LDP), Resource Reservation Protocol (RSVP), etc.) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures, etc.) on the control plane (e.g., database 708). The control plane 701 programs the data plane (e.g., line cards 702-703) with information (e.g., adjacency and route information) based on the routing structure(s). For example, the control plane 701 programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main routing information base (RIB) based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols. For layer 2 forwarding, the network element 700 can store one or more bridging tables that are used to forward data based on the layer 2 information in this data.

For the purpose of illustration only, only one control card and two line cards are shown in FIG. 5. Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway), etc.). By way of example, a service card may be used to terminate IPsec tunnels and execute the attendant authentication and encryption algorithms. As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video).

Subscriber end stations (e.g., servers, workstations, laptops, palm tops, mobile phones, smart phones, multimedia phones, Voice Over Internet Protocol (VOIP) phones, portable media players, global positioning system (GPS) units, gaming systems, set-top boxes, etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public Web pages (free content, store fronts, search services, etc.), private Web pages (e.g., username/password accessed Web pages providing email services, etc.), corporate networks over VPNs, etc. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method performed within a network element to establish a HELLO session with a remote node that is not immediately adjacent to the network element to determine, based on HELLO messages exchanged during the HELLO session, whether the remote node restarts, in order to preserve and recover state information of one or more protected label switched paths (LSPs) between the network element and the remote node, for the purpose of performing a restart procedure within the network element in view of restarting of the remote node, the method comprising the steps of:

establishing the HELLO session with the remote node, including exchanging HELLO messages with the remote node, wherein each HELLO message includes a time-to-live (TTL) value greater than one if the HELLO message is to be routed using an Internet protocol (IP) forwarding protocol, wherein each HELLO message includes a TTL value of one if the HELLO message is to be forwarded via a tunnel established between the local and remote nodes;

in response to at least one of a link failure and a node failure of the protected LSP, switching network traffic onto a protection path according to a fast re-reroute (FRR) scheme; and in response to a restart of the remote node, based on the HELLO messages exchanged during the HELLO session, performing the restart procedure according to a resource reservation protocol (RSVP) traffic engineering (TE) graceful restart (RSVP-TE GR) mechanism for preservation and recovery of LSP state information of the protected LSPs.

2. The method of claim 1, wherein the TTL value of the HELLO messages is set to at least equal to or greater than a number of intermediate nodes between the network element and the remote node, such that the HELLO messages are not dropped by any of the intermediate nodes.

3. The method of claim 1, wherein the network element is a point of local repair (PLR) node and the remote node is a merge point (MP) node of the protected LSP, and wherein there is at least one intermediate node in the protection path between the PLR node and the MP node.

4. The method of claim 1, wherein the HELLO session is established while the FRR scheme is in effect on the protection path.

5. The method of claim 1, wherein the HELLO session is established by the network element without statically configuring the remote node as a neighboring node.

6. A network element for establishing a HELLO session with a remote node that is not immediately adjacent to the network element to determine, based on HELLO messages exchanged during the HELLO session, whether the remote node restarts, in order to preserve state information of a protected label switched path (LSP) between the network element and the remote node, for the purpose of performing a restart procedure within the network element in view of restarting of the remote node, the network element comprising:
- a fast re-reroute (FRR) unit, in response to at least one of a link failure and a node failure of the protected LSP, to select a protection path and switch network traffic onto the protection path according to a fast re-reroute (FRR) scheme;
- a HELLO handling unit coupled to the FRR unit to establish a HELLO session with the remote node that is not immediately adjacent to the network element, including exchanging one or more HELLO messages with the remote node over the protection path, wherein each HELLO message includes a time-to-live (TTL) value of greater than one if the HELLO message is to be routed based on an Internet protocol (IP) forwarding protocol, wherein each HELLO message includes a TTL value of one if the HELLO message is to be sent via a tunnel between the network element and the remote node; and
- restart unit coupled to the FRR unit and the HELLO handling unit, in response to a restart of the remote node, to perform the restart procedure according to a resource reservation protocol (RSVP) traffic engineering (TE) graceful restart (RSVP-TE GR) protocol using LSP state information of the protected LSP preserved based on the one or more HELLO messages of the HELLO session.

7. The network element of claim 6, wherein the TTL value of the HELLO messages is set to at least equal to or greater than a number of intermediate nodes between the network element and the remote node, such that the HELLO messages are not dropped by any of the intermediate nodes.

8. The network element of claim 6, wherein the network element is a point of local repair (PLR) node and the remote node is a merge point (MP) node of the protected LSP, and wherein there is at least one intermediate node in the protection path between the PLR node and the MP node.

9. The network element of claim 6, wherein the HELLO session is established while the FRR scheme is in effect on the protection path.

10. The network element of claim 6, wherein the HELLO session is established by the network element without statically configuring the remote node as a neighboring node.

11. A machine-implemented method performed within a network element to establish a HELLO session with a remote node that is not immediately adjacent to the network element to determine based, on HELLO messages exchanged during the HELLO session, whether the remote node restarts, in order to preserve state information of a protected label switched path (LSP) between the network element and the remote node, for the purpose of performing a restart procedure within the network element in view of restarting of the remote node, the method comprising the steps of:
- receiving a path message from the remote node via IP forwarding or a bypass tunnel between the network element and remote node that is configured to protect the protected LSP, wherein network traffic has been switched onto a protection path using a fast re-route (FRR) scheme in response to a link failure or a node failure of the protected LSP;
- in response to the path message, establishing a HELLO session with the remote node that is not immediately adjacent to the network element, including exchanging HELLO messages with the remote node over the protection path, wherein each HELLO message includes a time-to-live (TTL) value of greater than one if the HELLO message is to be routed via IP forwarding, wherein each HELLO message includes a TTL value of one if the HELLO message is to be forwarded via a tunnel established between the network element and the remote node; and
- in response to a restart of the remote node, performing the restart procedure according to a resource reservation protocol (RSVP) traffic engineering (TE) graceful restart (RSVP-TE GR) protocol using LSP state information of the protected LSP preserved based on the HELLO messages of the HELLO session.

12. The method of claim 11, wherein the TTL value of the HELLO messages is set to at least equal to or greater than a number of intermediate nodes between the network element and the remote node, such that the HELLO messages are not dropped by any of the intermediate nodes.

13. The method of claim 11, wherein the network element is a merge point (MP) node and the remote node is a point of local repair (PLR) node of the protected LSP, and wherein there is at least one intermediate node in the protection path between the PLR node and the MP node.

14. The method of claim 11, wherein the HELLO session is established while the FRR scheme is in effect on the protection path.

15. The method of claim 11, wherein the HELLO session is established by the network element without statically configuring the remote node as a neighbor node.

16. A network element for establishing a HELLO session with a remote node that is not immediately adjacent to the network element to determine, based on HELLO messages exchanged during the HELLO session, whether the remote node restarts, in order to preserve state information of a protected label switched path (LSP) between the network element and the remote node, for the purpose of performing a restart procedure within the network element in view of restarting of the remote node, the network element comprising:
- a receiver to receive a path message from the remote node via one of IP forwarding and a bypass tunnel that is configured to protect the protected LSP, wherein network traffic has been switched onto a protection path using a fast re-route (FRR) scheme in response to at least one of a link failure and a node failure of the protected LSP;
- a HELLO handling unit coupled to the receiver, in response to the path message, to establish a HELLO session with the remote node that is not immediately adjacent to the network element, including exchanging one or more HELLO messages with the remote node over the protection path, wherein each HELLO message includes a time-to-live (TTL) value of greater than one if the HELLO message is to be routed via IP forwarding, wherein each HELLO message includes a TTL value of one if the HELLO message is to be forwarded via a tunnel established between the network element and the remote node; and a restart unit coupled to the HELLO handling unit, in response to a restart of the remote node, to perform a restart procedure according to a resource reservation protocol (RSVP) traffic engineering (TE) graceful restart (RSVP-TE GR) protocol using LSP state information of the protected LSP preserved based on the one or more HELLO messages of the HELLO session.

17. The network element of claim 16, wherein the TTL value of the one or more HELLO messages is configured to at least equal to or greater than a number of intermediate nodes between the network element and the remote node, such that the HELLO messages are not dropped by any of the intermediate nodes.

18. The network element of claim 16, wherein the network element is a merge point (MP) node and the remote node is a point of local repair (PLR) node of the protected LSP, and wherein there is at least one intermediate node in the protection path between the PLR node and the MP node.

19. The network element of claim 16, wherein the HELLO session is established while the FRR scheme is in effect on the protection path.

20. The network element of claim 16, wherein the HELLO session is established by the network element without statically configuring the remote node as a neighboring node.

* * * * *

UNITED STATES PATENT AND TRADEMARK OFFICE
CERTIFICATE OF CORRECTION

| | |
|---|---|
| PATENT NO. | : 8,339,942 B2 |
| APPLICATION NO. | : 12/580019 |
| DATED | : December 25, 2012 |
| INVENTOR(S) | : Liu et al. |

It is certified that error appears in the above-identified patent and that said Letters Patent is hereby corrected as shown below:

In Column 11, Line 66, in Claim 11, delete "determine based," and insert -- determine, based --, therefor.

In Column 12, Line 45, in Claim 15, delete "neighbor" and insert -- neighboring --, therefor.

Signed and Sealed this
Ninth Day of April, 2013

Teresa Stanek Rea
*Acting Director of the United States Patent and Trademark Office*